(12) United States Patent
Bhosale et al.

(10) Patent No.: US 11,246,252 B2
(45) Date of Patent: Feb. 15, 2022

(54) PICK-UP HITCH ASSEMBLY

(71) Applicant: Deere & Company, Moline, IL (US)

(72) Inventors: Digvijay A. Bhosale, Maharashtra (IN); Benjamin J. Heimbuch, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 181 days.

(21) Appl. No.: 16/669,918

(22) Filed: Oct. 31, 2019

(65) Prior Publication Data

US 2021/0127543 A1 May 6, 2021

(51) Int. Cl.
*B60D 1/46* (2006.01)
*A01B 59/042* (2006.01)

(52) U.S. Cl.
CPC ............ *A01B 59/042* (2013.01); *B60D 1/465* (2013.01)

(58) Field of Classification Search
CPC .............................. A01B 59/042; B60D 1/465
USPC ........................................................ 280/477
See application file for complete search history.

(56) References Cited

U.S. PATENT DOCUMENTS

| | | |
|---|---|---|
| 3,561,789 A | 2/1971 | Stikeleather |
| 6,149,180 A | 11/2000 | Haws |
| 7,425,013 B1 | 9/2008 | Bartlett |
| 8,678,421 B1 | 3/2014 | Williams, Jr. et al. |
| 2004/0021293 A1 | 2/2004 | Pogue |
| 2005/0028406 A1 | 2/2005 | Elliott |
| 2019/0135060 A1 | 5/2019 | Frisz |

FOREIGN PATENT DOCUMENTS

| | | |
|---|---|---|
| EP | 0695655 A1 | 2/1996 |
| EP | 1609344 B1 | 1/2007 |
| EP | 1867499 B1 | 12/2007 |
| EP | 2641758 A1 | 9/2013 |
| GB | 2456892 A | 8/2009 |

OTHER PUBLICATIONS

European Search Report issued in counterpart application No. 20198881.3 dated Mar. 9, 2021 (15 pages).
Scharmüller Gesellschaft M.B.H & COKG, "Art.Nr. 00.400.61.0-A02 | Pick-Up Hitches | Standard," https://www.scharmueller.at/en/pick-up-hitches/standard/00.400.61.0-32237.html, dated Jul. 31, 2019, 1 page.
European Search Report issued in counterpart application No. 20198881.3 dated May 28, 2021 (14 pages).

*Primary Examiner* — Tony H Winner
*Assistant Examiner* — Felicia L. Brittman
(74) *Attorney, Agent, or Firm* — Tucker Ellis LLP; Patrick F. Clunk

(57) ABSTRACT

Provided is a pick-up hitch assembly for connection to a vehicle. The pick-up hitch assembly includes a swing frame having a first end configured to be coupled to the vehicle and a second end, a slide frame movable relative to the swing frame between a retracted position and an extended position, and an electrically powered actuator assembly configured to be coupled to the vehicle and being coupled to the swing frame at the second end of the swing frame. The actuator assembly is configured to move the swing frame between a raised position and a lowered position independent of movement of the slide frame and of a three-point hitch.

20 Claims, 11 Drawing Sheets

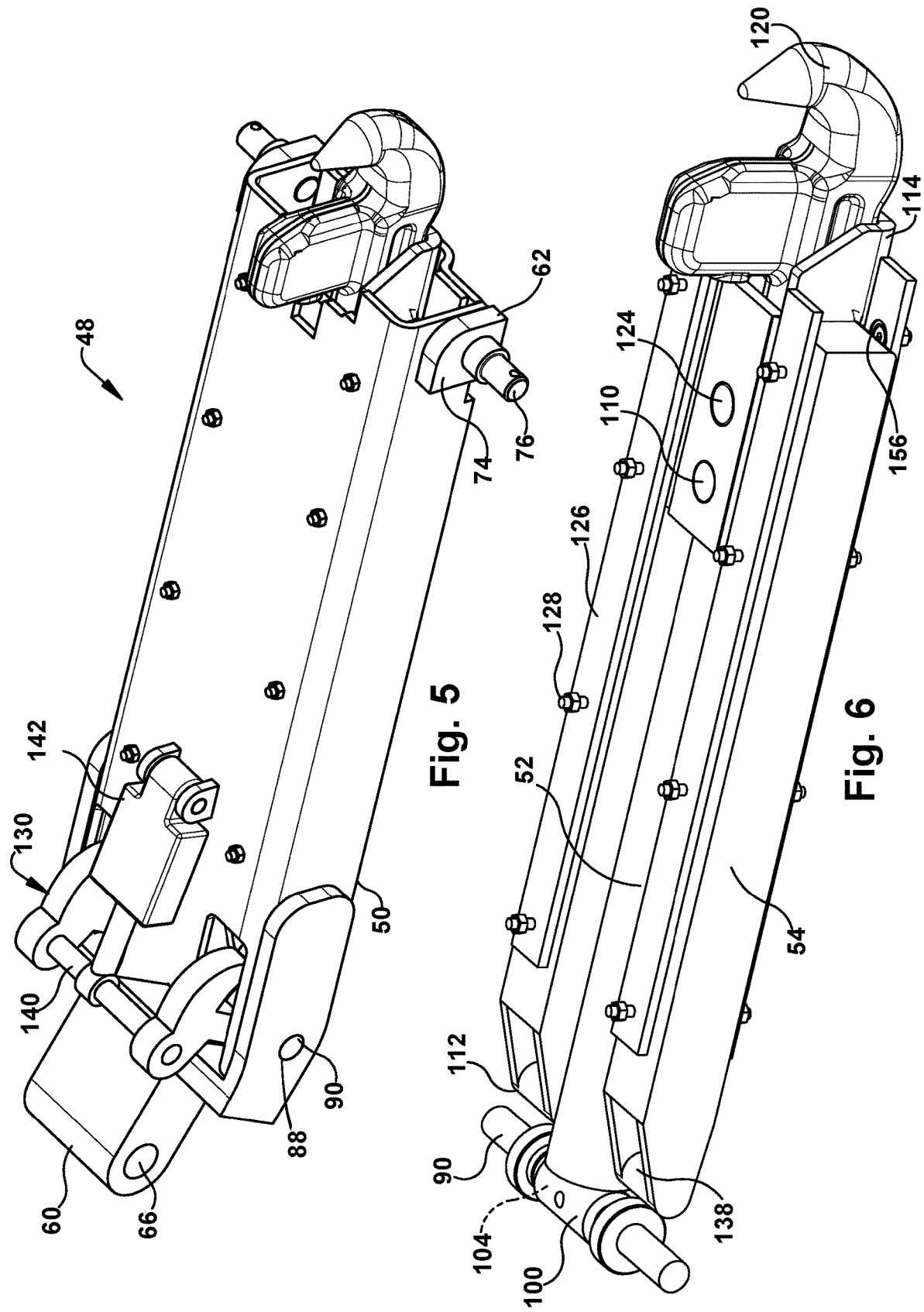

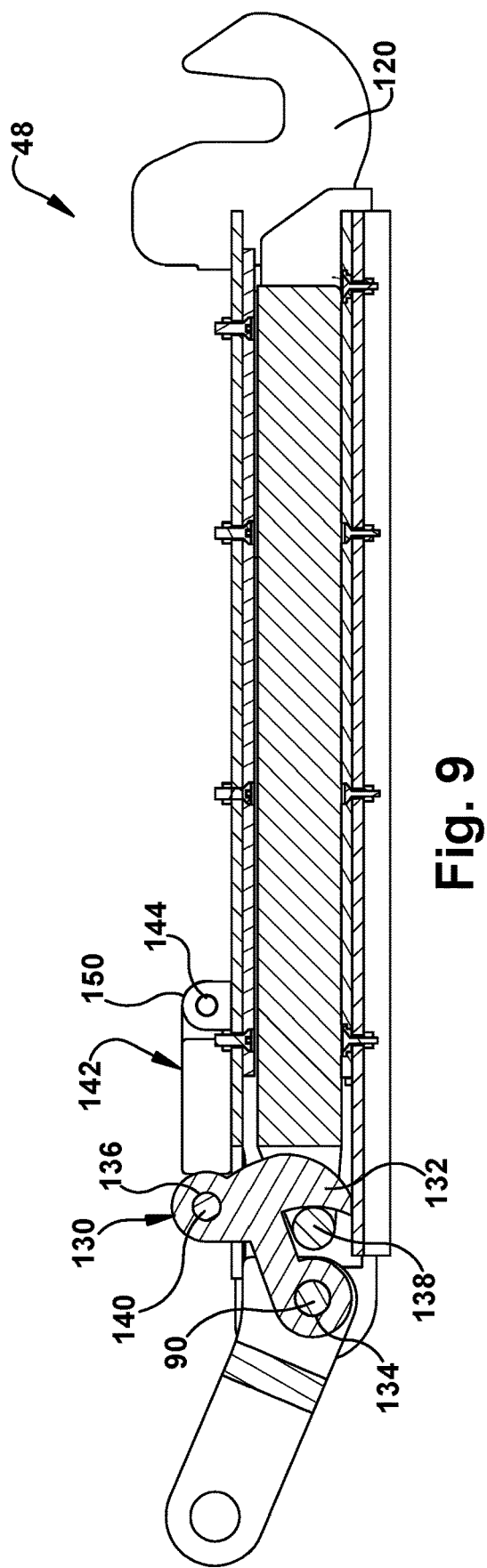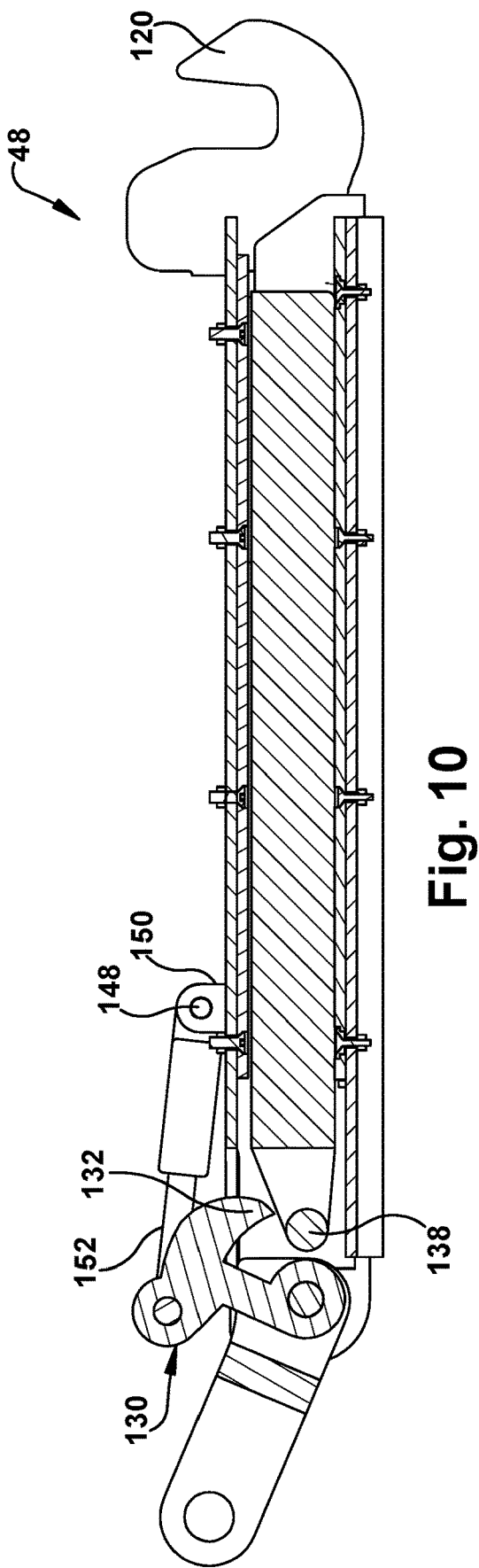

PICK-UP HITCH ASSEMBLY

BACKGROUND

A tractor or utility vehicle used for agricultural work may be used for transport tasks and for carrying out tasks in the field. The tractor or utility vehicle can be coupled to an implement that has electoral couplers, hydraulic couplers, and/or a power takeoff that is connected to the tractor couplers and to the tractor power takeoff. Implements attached to a tractor or utility vehicle are generally not utilized full time, and thus a coupling mechanism is provided to allow for convenient connecting and disconnecting of the implement.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation, a pick-up hitch assembly for connection to a vehicle is provided. The pick-up hitch assembly includes a swing frame having a first end configured to be coupled to the vehicle and a second end, a slide frame movable relative to the swing frame between a retracted position and an extended position, and an electrically powered actuator assembly configured to be coupled to the vehicle and being coupled to the swing frame at the second end of the swing frame. The actuator assembly is configured to move the swing frame between a raised position and a lowered position independent of movement of the slide frame.

In another implementation, a vehicle is provided that includes a frame having a rear vehicle housing, and a pick-up hitch assembly attached to the rear vehicle housing, the pick-up hitch assembly including a swing frame having a first end pivotally coupled to the vehicle and a second end, a cylinder having a first end coupled to the swing frame and a second end, a slide frame coupled to the second end of the cylinder and movable relative to the swing frame between a retracted position and an extended position, and an electrically powered actuator assembly configured to be coupled to the vehicle and being coupled to the swing frame at the second end of the swing frame, the actuator assembly configured to move the swing frame between a raised position and a lowered position independent of a three-point hitch assembly.

In still another implementation, a pick-up hitch assembly for connection to a vehicle is provided. The pick-up hitch assembly includes a swing frame having a first end configured to be coupled to the vehicle and a second end, a slide frame coupled to the swing frame and movable relative to the swing frame between a retracted position and an extended position, and an actuator assembly configured to be coupled to the vehicle and being coupled to the swing frame at the second end, the actuator assembly including first and second rail assemblies each having a rail with a chamber extending along a length of the rail and a slot extending along the length of the rail into the chamber, an electric motor, a lead screw disposed in the chamber and configured to be rotated by the electric motor, a block movable vertically by rotation of the lead screw, and a link pivotally coupled to the block and the second end of swing frame to effect movement of the swing frame between a raised position and a lowered position.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein:

FIG. 5 is a perspective view of a frame assembly of the pick-up hitch assembly.

FIG. 6 is another perspective view of elements of the frame assembly.

FIG. 9 is a cross-sectional view taken about line 9-9 in FIG. 7 showing a slide frame in a retracted position and locked position.

FIG. 10 is a cross-sectional view showing the slide frame in the retracted portion and an unlocked position.

DETAILED DESCRIPTION

Figure 1:
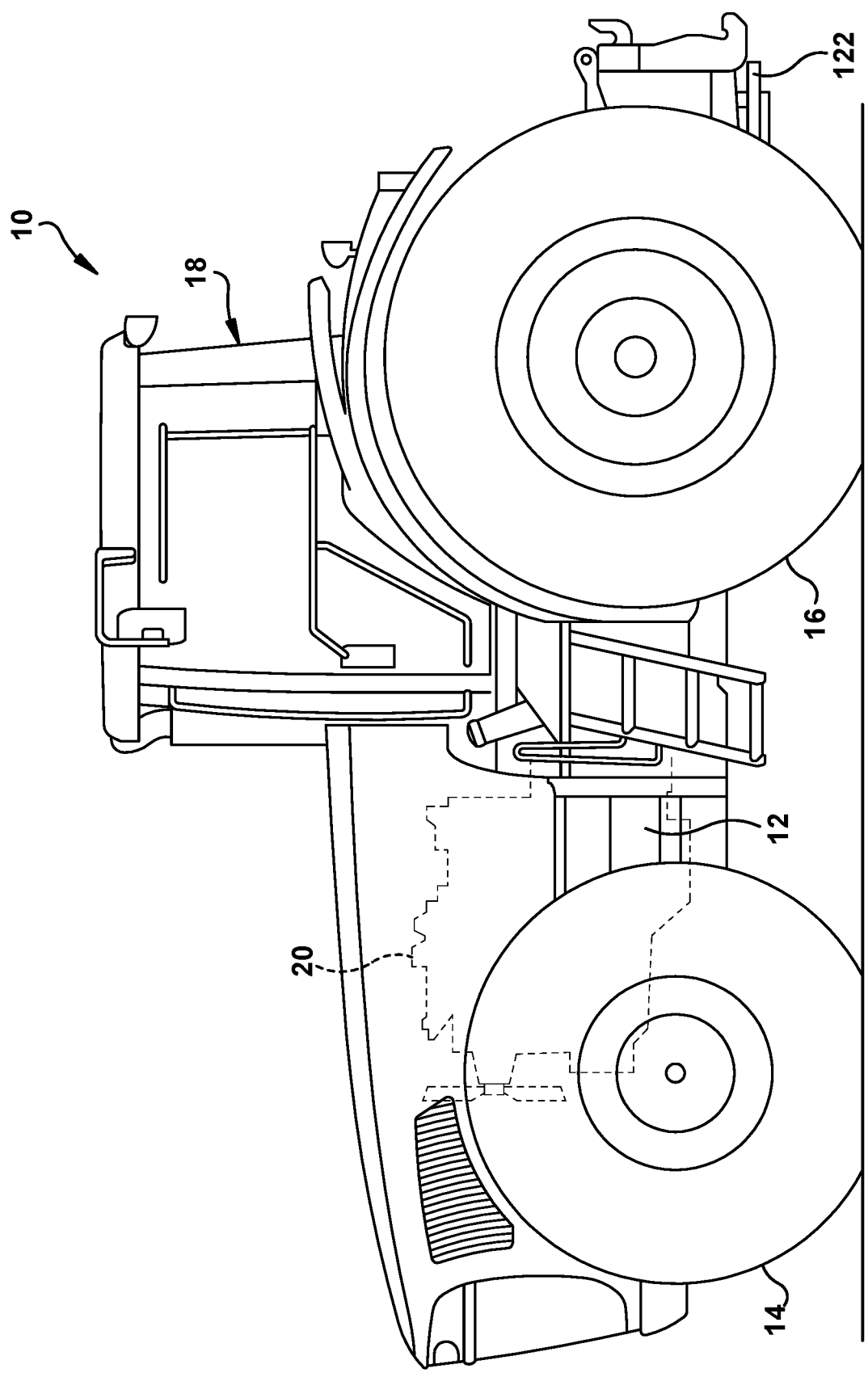
FIG. 1 is a side view of a tractor.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Referring initially to FIG. 1, a vehicle, such as a tractor, is shown at reference numeral 10. The tractor includes a frame 12, front tires 14, rear tires 16, a vehicle cab 18, an engine 20, and a pick-up hitch 22. The engine may be any suitable engine, such as a diesel engine, or alternatively may be replaced by a suitable electric motor assembly.

Figure 2:
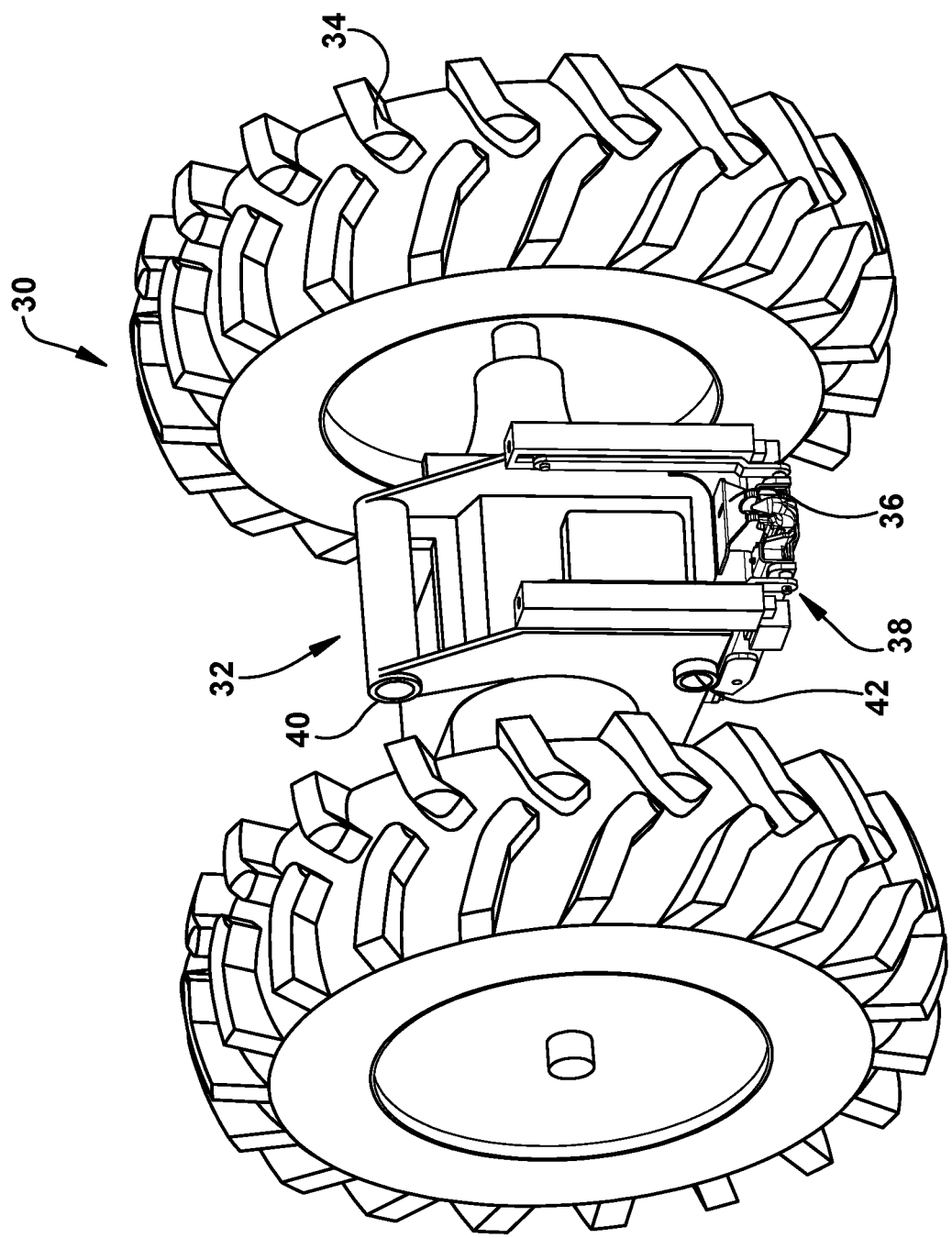
FIG. 2 is a perspective view of a rear portion of a tractor.

Turning now to FIG. 2, a rear portion 30 of a vehicle is shown that can replace a rear portion of the vehicle 10. The rear portion 30 includes a rear vehicle housing 32, a pair of rear tires 34, a pick-up hitch fix frame 36 attached to the rear vehicle housing 32, and a pick-up hitch assembly 38 attached to the rear vehicle housing 32 and the pick-up hitch fix frame 36 as will be described in detail below. The rear vehicle housing 32 can include connection points 40 and 42 for connection to a three-point hitch lift arm assembly, for example, although it will be appreciated that vehicles can be proved without three point hitch lift arm assemblies.

Turning now to FIGS. 3-6, the pick-up hitch assembly 38 will be discussed in detail. The pick-up hitch assembly 38 includes a frame assembly 48, which can include a swing frame 50, a cylinder 52, and a slide frame 54 movable relative to the swing frame 50 by the cylinder 52, and an actuator assembly 56 for moving the swing frame 50.

The swing frame 50 has a first end 60 coupled to the rear vehicle housing 32 by front supports 64 and a second end 62 coupled to the actuator assembly 56. The front supports 64 are provided on opposite sides of the swing frame 50 at the first end 60, and the swing frame 50 and the front supports 64 each have a through passage 66 and 68 respectively that align to receive a pin 70 to pivotally couple the swing frame 50 to the front supports 64. The front supports 64 are secured to the rear vehicle housing 32 by suitable fasteners, such as bolts 72, for example at an underside of the rear vehicle housing 32 to couple the first end 60 of the swing frame 50 to the rear vehicle housing 32. A horizontal load applied to the assembly 38 will transfer through the swing frame 50 and front supports 64 to the rear vehicle housing 32.

To couple the second end 62 of the swing frame 50 to the actuator assembly 56, the swing frame 50 includes openings 74 at the second end 62 at opposite sides thereof for receiving respective pins 76. The pins 76 extend outward from the swing frame 50 in a direction perpendicular to a longitudinal axis of the swing frame 50. The pins 76 are also received in respective openings 78 in links 80 of the actuator assembly 56 to pivotally couple the swing frame 50 to the actuator assembly 56. It will be appreciated that the pins 76 may alternatively be integrally formed with the swing frame 50. It will also be appreciated that the swing frame 50 may be formed of separate pieces for ease of manufacture. For example, the swing frame 50 can be formed of a first swing frame member 82 and a second swing frame member 84 that are attached to one another in a suitable manner, such as by welding.

Figure 7:
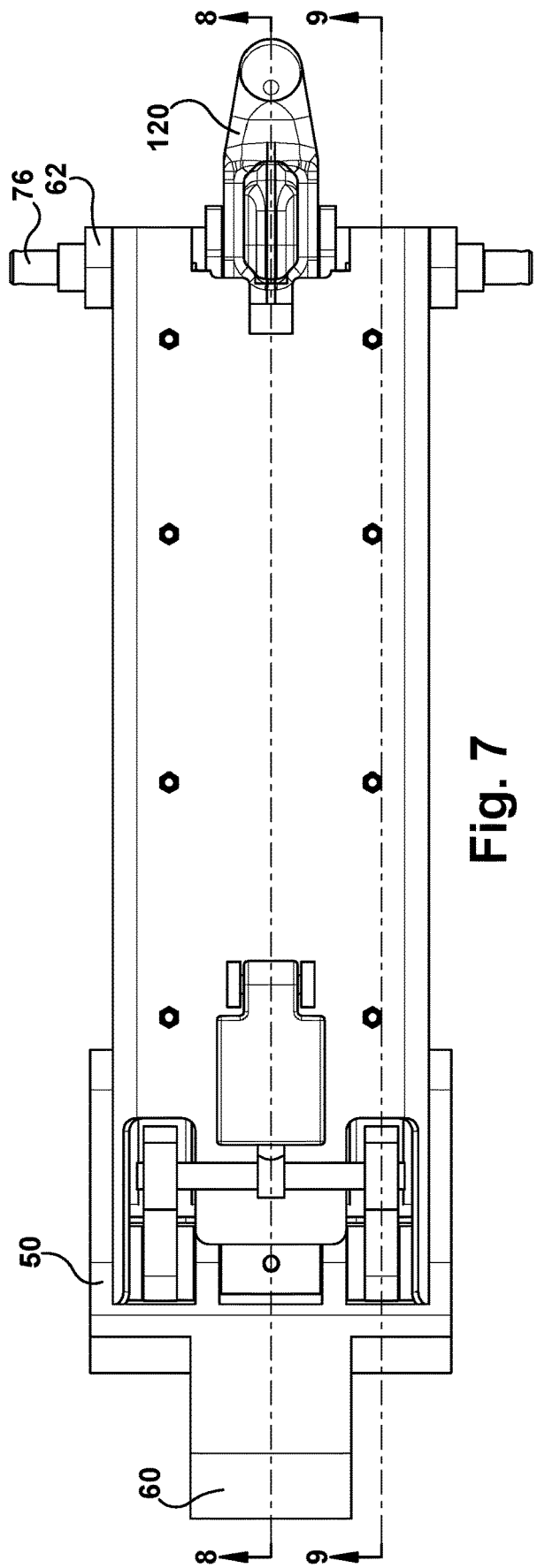
FIG. 7 is a top view of the frame assembly.
Figure 8:
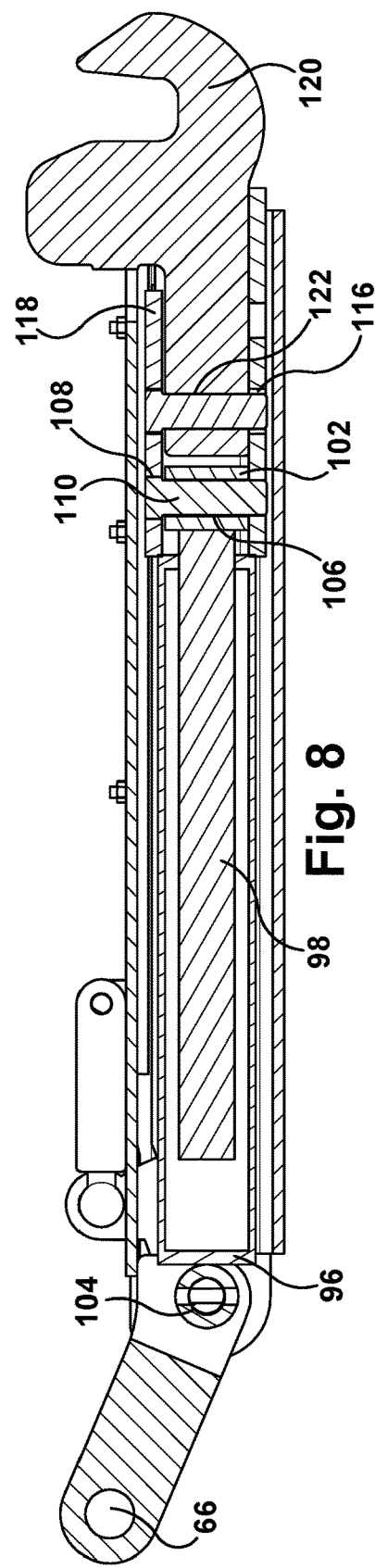
FIG. 8 is a cross-sectional view taken about line 8-8 in FIG. 7.

Turning now to FIGS. 6-8, the cylinder 52 may be a suitable cylinder having a body 96 and a rod 98 movable relative to the body 96. The cylinder 52 has a first end 100 at the body 96 coupled to swing frame 50 to secure the cylinder 52 relative to the housing 32, and a second end 102 at the rod 98 coupled to the slide frame 54 to extend and retract the slide frame 54 relative to the swing frame 50. The cylinder can extend and retract the slide frame 54 independent of other operations, such as raising and lowering of the swing frame 50. The cylinder 52 includes through passage 104 at the first end 100 that aligns with an opening 88 in the swing frame spaced from the first end 60 to receive a pin 90 to couple the first end 100 of the cylinder 52 to the swing frame 50, and the cylinder 52 includes a through passage 106 at the second end 102 that aligns with a through passage 108 in the slide frame 54 to receive a pin 110 to couple the second end 102 of the cylinder 52 to the slide frame 54. As shown, the through passages 106 and 108 extend in a direction perpendicular to the through passage 104.

Referring now to the slide frame 54 in detail, the slide frame 54 has a first end 112 configured to be proximate the first end 100 of the cylinder 52 in the retracted position and a second end 114 configured to be proximate the second end 62 of the swing frame 50 in the retracted position. The slide frame 54 includes the through passage 108 proximate the second end 114, another through passage 116 adjacent the through passage 108 and extending perpendicular to the through passage 108, and a channel 118 extending from the second end 114 and into the through passage 116. The channel 118 receives an insert 120, such as a hook, that has a through passage 122 that aligns with the through passage 116 to receive a pin 124 to couple the insert 120 to the slide frame 54 such that the insert moves with the slide frame 54 between the retracted position and the extended position. When the cylinder 52 extends and retracts, the slide frame 54 moves along wear plates 126 secured to the swing frame 50 above and below the slide frame 54. As shown, four wear plates 126 are shown, two wear plates above the slide frame 54 and two wear plates below the slide frame 54, although it will be appreciated that any suitable number and configuration of wear plates 126 may be provided. The wear plates 126 may be secured to the swing frame 50 in a suitable manner, such as by a plurality of fasteners 128 that extend through counterbored openings 156 in the wear plates 126 and through respective openings in the slide frame 50.

Referring additionally to FIGS. 9 and 10, to lock the slide frame 54 to the swing frame 50, a pair of hooks 130 are provided. Each hook 130 includes a hook portion 132, a first through passage 134, and a second through passage 136. The hook portions 132 are configured to engage a respective slide frame pin 138 at the first end 112 of the slide frame 54 to prevent movement of the slide frame 54 from the retracted position to the extended position. The first through passages 134 are configured to align with the through passage 104 at the first end of the cylinder 52 on opposite sides of the cylinder 52 to receive the pin 90 to secure the hooks 130 to the swing frame 50 to prevent movement of the hooks in the extend direction while allowing for rotation of the hooks 130 about the pin 90. The second through passages 136 align with one another and receive a pin 140 for connecting the hooks 130 to a linear actuator 142 configured to move the hooks 130 between a lock position shown in FIG. 9 preventing movement of the slide frame 54 from the retracted position to the extended position and an unlock position shown in FIG. 10 allowing movement of the slide frame 54 to the extended position.

The linear actuator 142 may be connected to the swing frame 50 in a suitable manner, such as by a pin 144 that extends through a through passage in the actuator 142 and through respective through passages 148 in ears 150 that are on opposites sides of the actuator 142 and secured to or integrally formed with the swing frame 50. A movable rod 152 of the linear actuator 142 can include a through passage through which the pin 140 extends to connect the linear actuator 142 to the hooks 130. FIG. 9 shows the linear actuator 142 in its default a retracted position where the hook portions 132 are engaged with the respective slide frame pins 138 to prevent movement of the slide frame 54, and FIG. 10 shows the linear actuator 142 in an extended position where the hook portions 132 are rotated away from the respective slide frame pins 138 to disengage from the pins 138 to allow movement of the slide frame 54. The linear actuator 142 may be a suitable electric linear actuator, hydraulic actuator, etc. In an embodiment including a hydraulic actuator, a hydraulic cylinder could be used to extend/retract the slide frame 54 and the hydraulic actuator and hydraulic cylinder could be connected to the same hydraulic supply in sequence.

Figure 3:
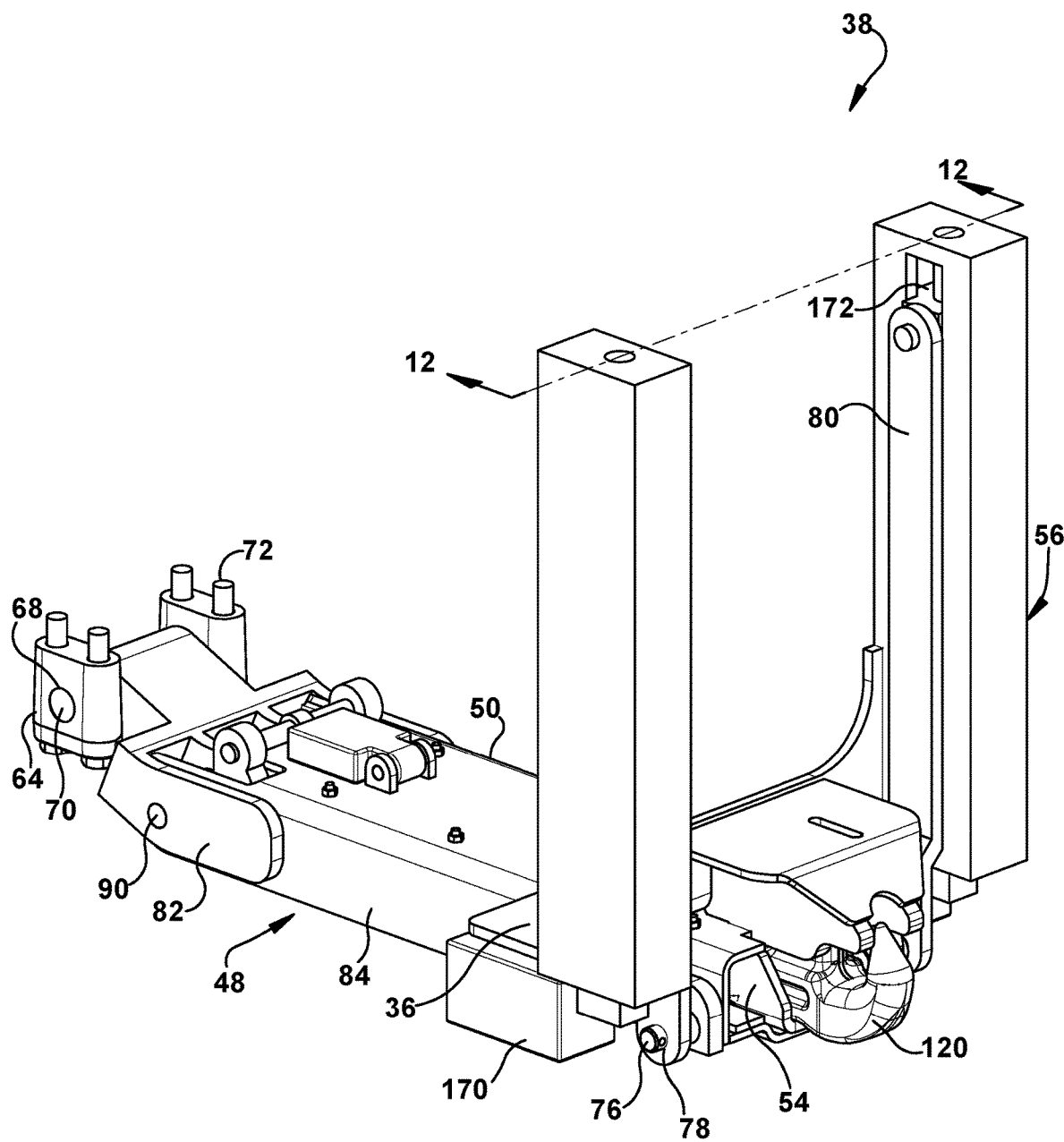
FIG. 3 is a perspective view of an exemplary pick-up hitch assembly.
Figure 4:
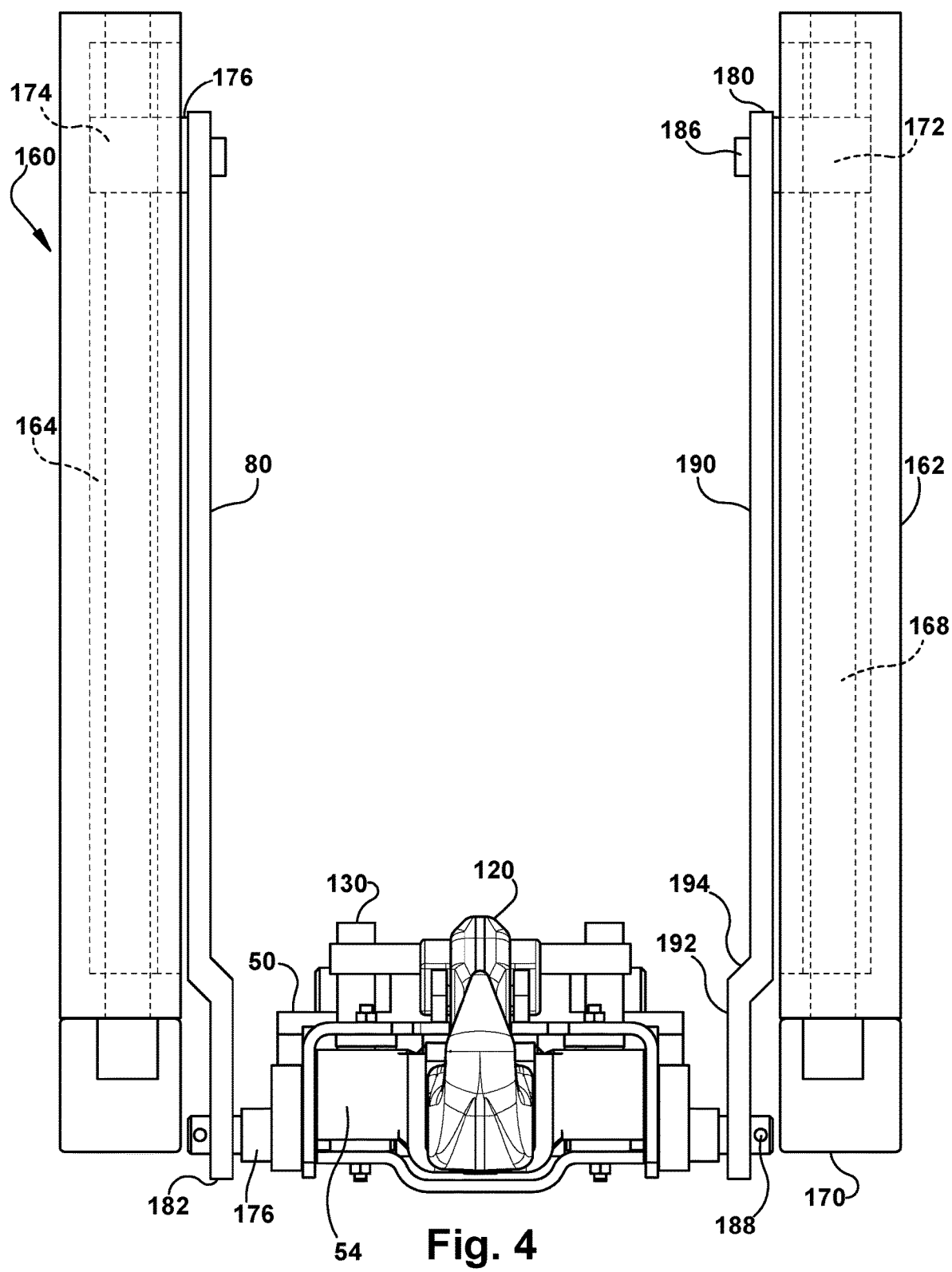
FIG. 4 is a front view of the pick-up hitch assembly.
Figure 11:
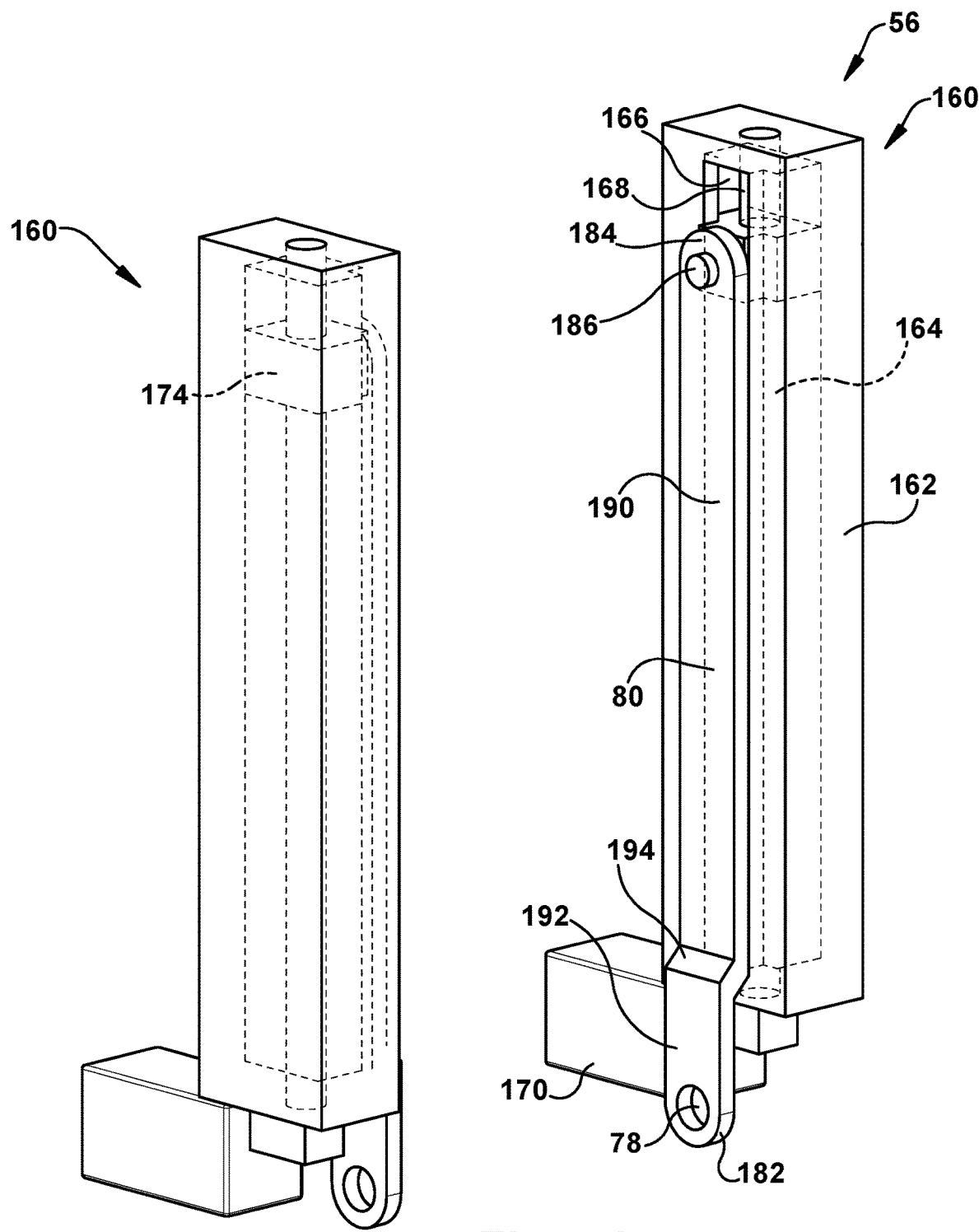
FIG. 11 is a perspective view of an actuator assembly of the pick-up hitch assembly.
Figure 12:
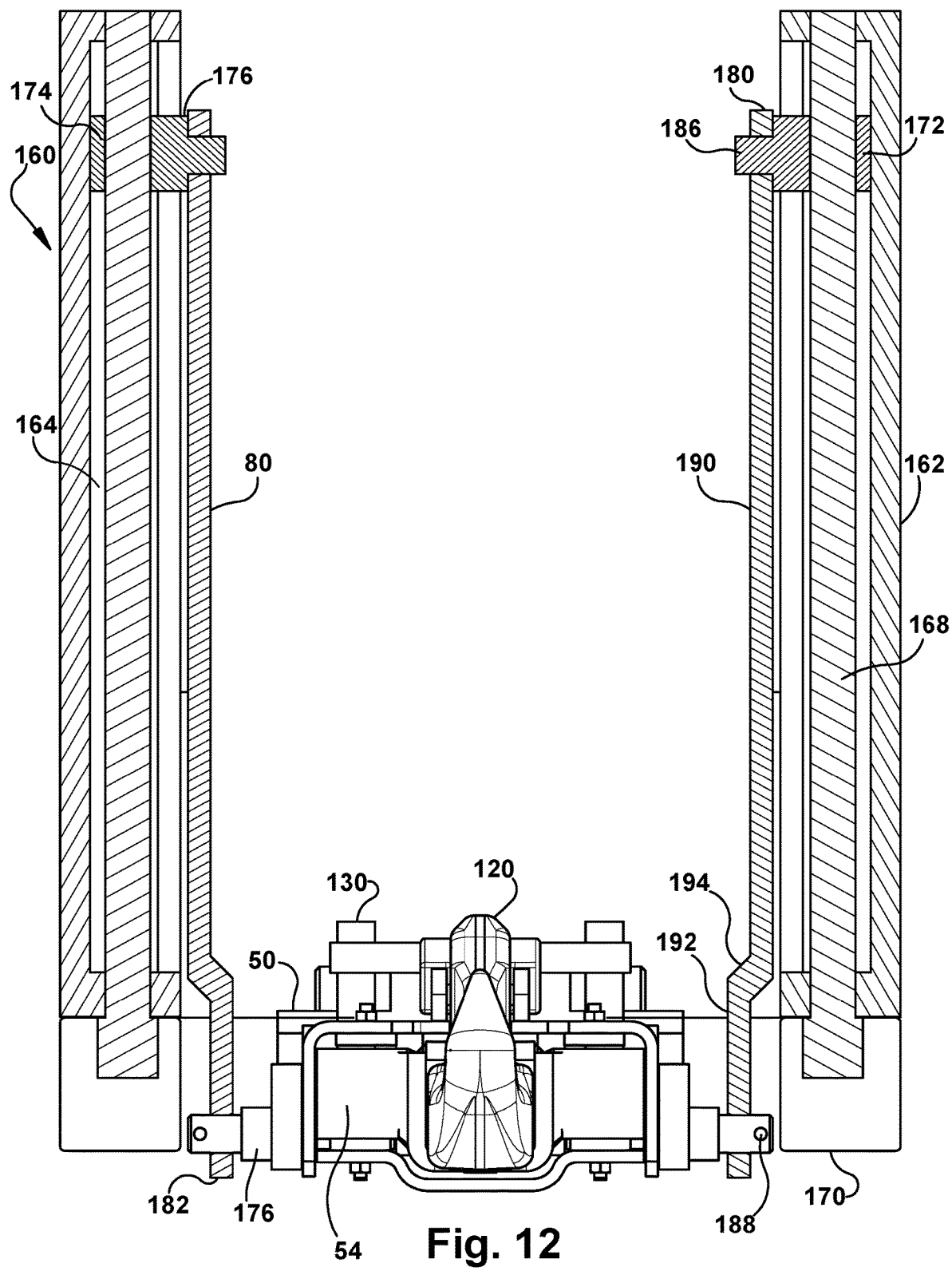
FIG. 12 is a cross-sectional view of the actuator assembly taken about line 12-12 in FIG. 3 with the slide frame and swing frame not shown.

Referring again to FIGS. 2 and 3 and additionally to FIGS. 11 and 12, the actuator assembly 56 will be described in detail. The actuator assembly 56 is configured to move the swing frame 50 between a raised position and a lowered position independent of movement of the slide frame 54 and independent of a three-point hitch assembly that can optionally be attached to the rear vehicle housing 32. The actuator assembly 56 includes a pair of rail assemblies 160 configured to attach to the pick-up hitch fix frame 36 as shown in FIG. 3. Each rail assembly 160 includes a rail 162 having a chamber 164 extending along a length of the rail 162 and opening to an outside of the rail 162 via a slot 166 extending at least partially along the length of the rail 162. A lead screw 168 is disposed in each chamber 164 and connected to a respective motor 170 that is configured to rotate the screw 168. As shown, each motor 170 is an electric motor electrically connected to a control unit on the vehicle 10, although it will be appreciated that other suitable motors may be used, such as hydraulic motors or the rotational motion may be provided by the drivetrain mechanism of the vehicle 10. In an embodiment, the control unit can control the assembly 38 to automatically connect the hook 120 to the implement. Each rail 162 and motor 170 is connected to the pick-up hitch fix frame 36 at opposite sides of the pick-up hitch fix frame 36. For example, each rail 162 is connected to a vertical surface of the pick-up hitch fix frame 36 at a backside of each rail 162 and each motor 170 is connected to a bottom surface of the pick-up hitch fix frame 36 such that each motor 170 is below the respective one of the rails 162. The present configuration allows a vertical load applied to the assembly 38, for example by an implement connected to the hook 120, to be carried by the rail assembly 160 such that the pick-up hitch fix frame 36 receives the vertical load and not the horizontal load. By spreading out the vertical and horizontal load, the entire implement load is not applied to the pick-up hitch fix frame thereby increasing lift and pull capacity of the pick-up hitch assembly.

Each rail assembly 160 additionally includes a block 172 having a first portion 174 disposed in the chamber 164 and a second portion 176 extending from the first portion 174 through the respective slot 166. The first portion 174 of each block 172 has a threaded through passage 178 through which the lead screw 168 extends such that rotation of the lead screw 168 effects vertical movement of the block 172.

Each rail assembly 160 further includes the lift link 80 having a first end 180 and a second end 182. Proximate the first end 180 of each link 80 is an opening 184 and proximate the second end 182 of each link 80 is the opening 78. The first end 180 of each lift link 80 is pivotally coupled to the second portion 176 of each block 172 by a pin 186 that is secured to or integrally formed with the block 172 and received in the opening 184. Each link 80 can be held in position on the respective pin 186 in any suitable manner, such as by a flanged portion of the pin 186, a suitable fastener, etc. The second end 182 of each lift link 80 is pivotally coupled to the swing frame 50 by the pin 76 that is received in the opening 78. Each link 80 can be held in position on the respective pin 76 in any suitable manner, such as by a suitable fastener received in an opening 188 in the pin 76, a flanged portion of the pin, etc. As shown, each lift link 80 has a first vertical portion 190 and a second vertical portion 192 that are substantially parallel to one another and offset by an angled portion 194 proximate the second end 182 of the lift links 80.

Figure 13:
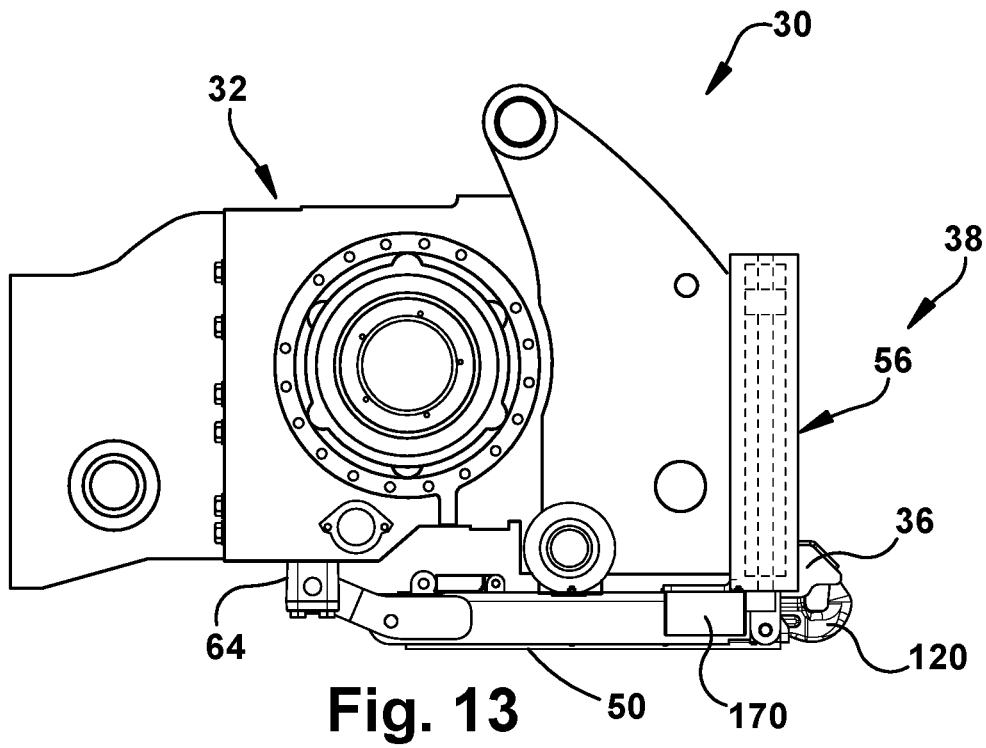
FIG. 13 is a side view of the rear portion of the tractor showing a swing frame in a raised position and the slide frame in the retracted position.
Figure 14:
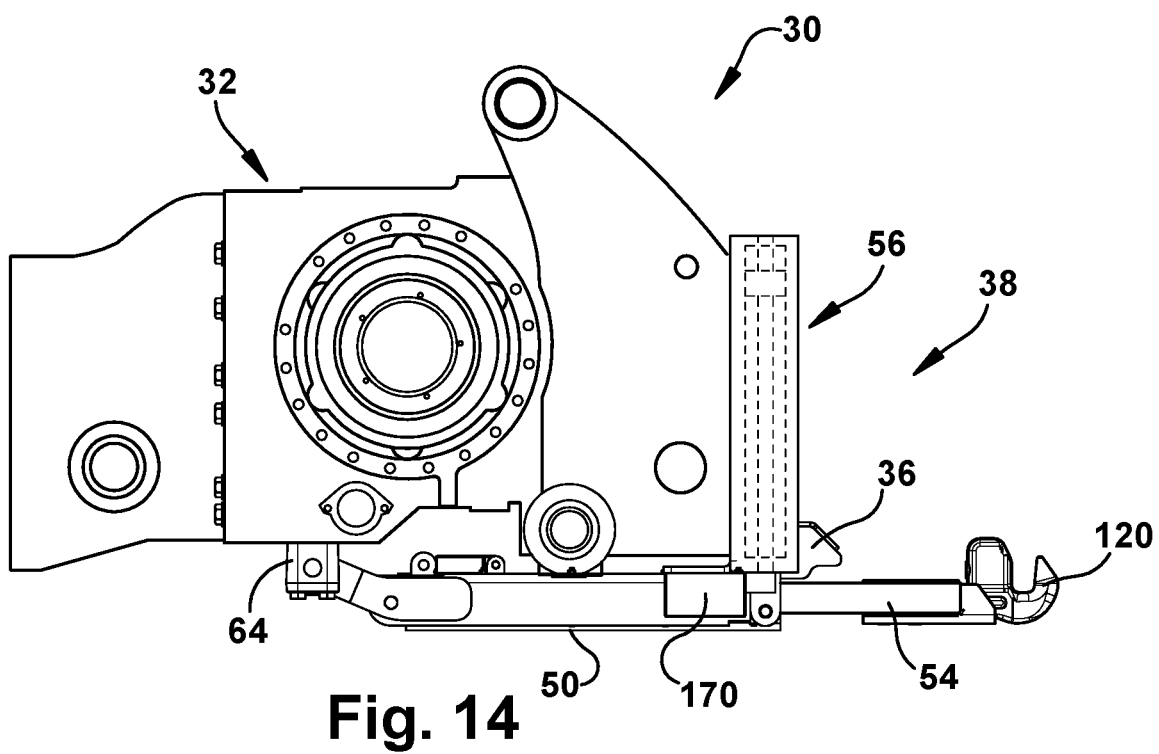
FIG. 14 is a side view of the rear portion of the tractor showing the swing frame in the raised position and the slide frame in the extended position.

Turning now to FIGS. 13-16, movement of the pick-up hitch assembly 38 will be described. As shown in FIG. 13, the pick-up hitch assembly 38 is shown with the swing frame 50 in the raised position and the slide frame 54 in the retracted position where the cylinder 52 is retracted and the hooks 130 are in the lock position engaged with the slide frame pins 138. As shown in FIG. 14, the pick-up hitch assembly 38 is shown with the swing frame 50 in the raised position and the slide frame 54 in the extended position. To move the slide frame 54 between the retracted position and extended position, the linear actuator 142 is actuated such that the movable rod 152 moves from the retracted position to the extended position to rotate the hooks 130 about the pin 90. When the hooks 130 are rotated, the hook portions 132 are rotated away from the respective slide frame pins 138 to unlock the slide frame 54. The cylinder 52 can then be actuated such that the movable rod 98 moves from the retract position to the extend position to move the slide frame 54 horizontally relative to the swing frame 50.

Figure 15:
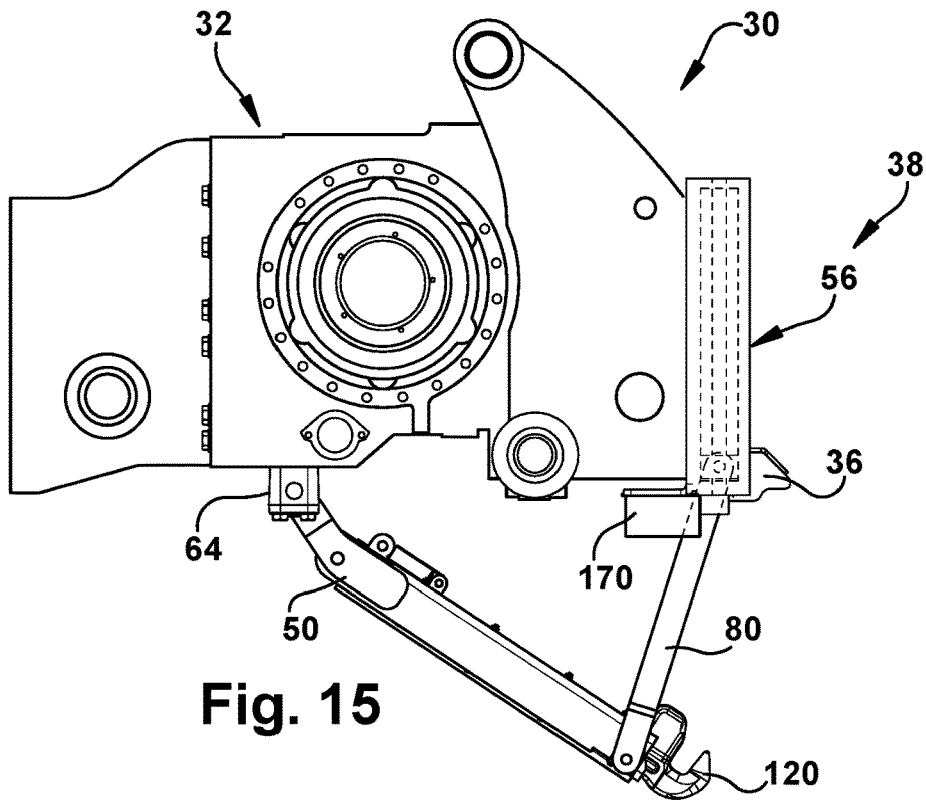
FIG. 15 is a side view of the rear portion of the tractor showing the swing frame in a lowered position and the slide frame in the retracted position.

As shown in FIG. 15, the pick-up hitch assembly 38 is shown with the swing frame 50 in the lowered position and the slide frame 54 in the retracted position where the cylinder 52 is retracted and the hooks 130 are in the lock position engaged with the slide frame pins 138. To move the swing frame 50 between the raised position and the lowered position, the electric motors 170 are activated to rotate the lead screws 168, thereby causing the blocks 172 to move vertically downward. As the blocks 172 move downward, the links 80 rotate about the pins 186 and 76 and move the second end 62 of the swing frame 50 downward, and the first end 60 of the swing frame 50 to rotate about the pin 70.

Figure 16:
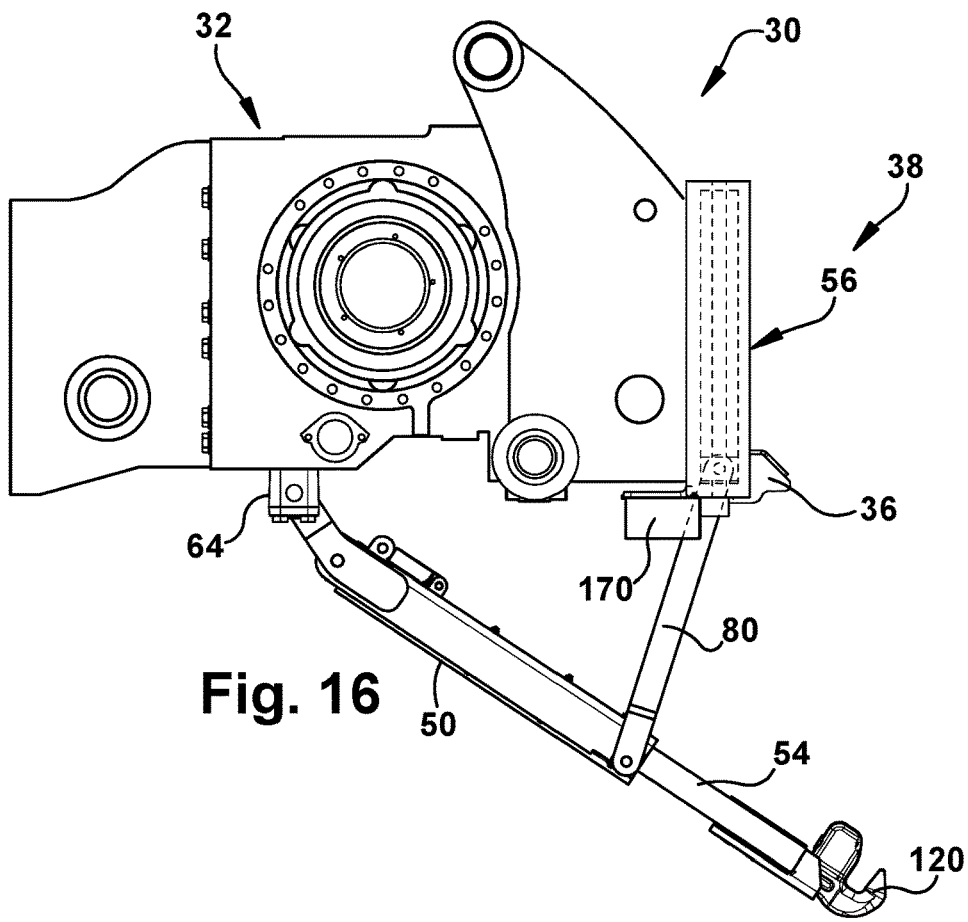
FIG. 16 is a side view of the rear portion of the tractor showing the swing frame in the lowered position and the slide frame in the extended position.

As shown in FIG. 16, the pick-up hitch assembly 38 is shown with the swing frame 50 in the lowered position and the slide frame 54 in the extended position. As noted above, to move the slide frame 54 between the retracted position and extended position, the hooks 130 are rotated to disengage from and unlock the side frame 54 to allow the cylinder to move from the retract position to the extend position to move the slide frame 54 horizontally relative to the swing frame 50. The slide frame 54 is shown being moved to the extended position after the swing frame 50 has moved to the lowered position, although it will be appreciated that the slide frame 54 and swing frame 50 may be moved at the same time or the swing frame 50 moved after the slide frame 54.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A pick-up hitch assembly for connection to a vehicle, the pick-up hitch assembly comprising:
    a swing frame having a first end configured to be coupled to the vehicle and a second end;
    a slide frame movable relative to the swing frame between a retracted position and an extended position; and
    an electrically powered actuator assembly configured to be coupled to the vehicle and being coupled to the swing frame at the second end of the swing frame, the actuator assembly configured to move the swing frame between a raised position and a lowered position independent of movement of the slide frame, the actuator assembly including first and second electric motors.

2. The pick-up hitch assembly according to claim 1, wherein the electrically powered actuator assembly includes first and second rail assemblies, each rail assembly including a rail configured to be coupled to the vehicle, a lead screw disposed in the rail and configured to be rotated by a respective one of the first and second electric motors, a block movable vertically by rotation of the lead screw, and a link pivotally coupled to the block and the second end of swing frame to effect raising and lowering of the swing frame.

3. The pick-up hitch assembly according to claim 2, wherein each rail includes a chamber extending along a length of the rail in which the lead screw and a first portion of the block are disposed, and a slot extending along the length of the rail into the chamber through which a second portion of the block extends to pivotally couple to the link.

4. The pick-up hitch assembly according to claim 3, further including a pin coupled to each of the second portions of the blocks, wherein each link includes an opening through which one of the pins extends to pivotally couple the link to the respective second portion of the block.

5. The pick-up hitch assembly according to claim 2, further including pins coupled to the swing frame at opposite sides of the second end, wherein each link includes an opening through which one of the pins extends to pivotally couple the link to the second end of the swing frame.

6. The pick-up hitch assembly according to claim 1, further including a cylinder having a first end coupled to the swing frame and a second end coupled to the slide frame to movably couple the slide frame to the swing frame and move the slide frame between the retracted position and the extended position.

7. The pick-up hitch assembly according to claim 1, wherein the slide frame has a first end configured to be proximate the first end of the swing frame in the retracted position and a second end, and wherein the slide frame is configured to be locked at the first end in the retracted position.

8. The pick-up hitch assembly according to claim 7, further including a pair of hooks pivotally coupled to the swing frame and movable by an actuator between a locked position where the hooks engage the slide frame at the first end to prevent movement of the slide frame from the retracted position, and an unlocked position where the hooks disengage the slide frame to allow movement of the slide frame to the extended position.

9. The pick-up hitch assembly according to claim 8, further comprising the actuator, wherein the actuator is a linear actuator coupled to the swing frame and includes a movable rod coupled to a pin that is coupled to each of the hooks, wherein when the linear actuator is in a retracted position the hooks are in the locked position, and when the linear actuator is in an extended position the hooks are in the unlocked position.

10. The pick-up hitch assembly according to claim 1, further comprising an implement coupled to the slide frame to move with the slide frame between the retracted position and the extended position.

11. The pick-up hitch assembly according to claim 1, further including a pair of front supports pivotally coupled to the first end of the swing frame and configured to be coupled to the vehicle such that the swing frame can pivot relative to the vehicle between the raised position and the lowered position.

12. The pick-up hitch assembly according to claim 1, further comprising wear plates disposed in the swing frame and secured to the swing frame above and below the slide frame for the slide frame to move along.

13. A vehicle comprising:
    a frame having a rear vehicle housing; and
    a pick-up hitch assembly attached to the rear vehicle housing, the pick-up hitch assembly including:
        a swing frame having a first end pivotally coupled to the vehicle and a second end;
        a cylinder having a first end coupled to the swing frame and a second end;
        a slide frame coupled to the second end of the cylinder and movable relative to the swing frame between a retracted position and an extended position; and an electrically powered actuator assembly configured to be coupled to the vehicle and being coupled to the swing frame at the second end of the swing frame, the actuator assembly configured to move the swing frame between a raised position and a lowered position independent of a three-point hitch assembly, wherein a horizontal load applied by an implement passes through the pick-up hitch assembly to the rear vehicle housing and a vertical load applied by the implement passes through the pick-up hitch assembly to a pick-up hitch fix frame.

14. The vehicle according to claim 13, wherein the electrically powered actuator assembly includes first and second rail assemblies, each rail assembly including a rail configured to be coupled to the vehicle, an electric motor, a lead screw disposed in the rail and configured to be rotated by the electric motor, a block movable vertically by rotation of the lead screw, and a link pivotally coupled to the block and the second end of swing frame to effect raising and lowering of the swing frame.

15. The vehicle according to claim 14, wherein each rail includes a chamber extending along a length of the rail in which the lead screw and a first portion of the block are disposed, and a slot extending along the length of the rail into the chamber through which a second portion of the block extends to pivotally couple to the link.

16. A pick-up hitch assembly for connection to a vehicle, the pick-up hitch assembly comprising:
  a swing frame having a first end configured to be coupled to the vehicle and a second end;
  a slide frame coupled to the swing frame and movable relative to the swing frame between a retracted position and an extended position; and
  an actuator assembly configured to be coupled to the vehicle and being coupled to the swing frame at the second end, the actuator assembly including first and second rail assemblies each having:
    a rail with a chamber extending along a length of the rail and a slot extending along the length of the rail into the chamber,
    an electric motor,
    a lead screw disposed in the chamber and configured to be rotated by the electric motor,
    a block movable vertically by rotation of the lead screw, and
    a link pivotally coupled to the block and the second end of swing frame to effect movement of the swing frame between a raised position and a lowered position.

17. The pick-up hitch assembly according to claim 16, further including a pair of hooks pivotally coupled to the swing frame and movable by a linear actuator between a locked position where the hooks engage the slide frame at a first end of the slide frame to prevent movement of the slide frame from the retracted position, and an unlocked position where the hooks disengage the slide frame to allow movement of the slide frame to the extended position.

18. The pick-up hitch assembly according to claim 17, further comprising the linear actuator, wherein the linear actuator is coupled to the swing frame and includes a movable rod coupled to a pin that is coupled to each of the hooks, wherein when the linear actuator is in a retracted position the hooks are in the locked position, and when the linear actuator is in an extended position the hooks are in the unlocked position.

19. The pick-up hitch assembly according to claim 16, further including a pair of front supports pivotally coupled to the first end of the swing frame and configured to be coupled to the vehicle such that the swing frame can pivot relative to the vehicle between the raised position and the lowered position.

20. The pick-up hitch assembly according to claim 16, further comprising wear plates disposed in the swing frame and secured to the swing frame above and below the slide frame for the slide frame to move along.

* * * * *